US008073267B2

(12) United States Patent
Paik et al.

(10) Patent No.: US 8,073,267 B2
(45) Date of Patent: Dec. 6, 2011

(54) APPARATUS AND METHOD FOR TRANSFORMING BETWEEN DISCRETE COSINE TRANSFORM COEFFICIENT AND DISCRETE WAVELET TRANSFORM COEFFICIENT

(75) Inventors: Joonki Paik, Seoul (KR); Sang-Hee Lim, Seoul (KR)

(73) Assignee: Chung-Ang University Industry Academy Cooperation Foundation, Seoul (KR)

( * ) Notice: Subject to any disclaimer, the term of this patent is extended or adjusted under 35 U.S.C. 154(b) by 819 days.

(21) Appl. No.: 12/169,043

(22) Filed: Jul. 8, 2008

(65) Prior Publication Data

US 2009/0016630 A1 Jan. 15, 2009

(30) Foreign Application Priority Data

Jul. 9, 2007 (KR) .................. 10-2007-0068882

(51) Int. Cl.
*G06K 9/46* (2006.01)
*G06K 9/36* (2006.01)
*H04N 7/12* (2006.01)

(52) U.S. Cl. ... 382/232; 382/250; 382/248; 375/240.19; 375/240.2

(58) Field of Classification Search .................. 382/232, 382/250, 248, 234; 375/240.19, 240.2
See application file for complete search history.

(56) References Cited

U.S. PATENT DOCUMENTS 7,092,965 B2 * 8/2006 Easwar ................................ 1/1
7,382,926 B2 * 6/2008 Joshi et al. ..................... 382/240

OTHER PUBLICATIONS

Ming-Fu Land, Yung-Chan Chen, Yi-Chia Chuang, Eric Hsi, "From DCT-based to Wavelet-based Video Transcoding Algorithm and Architecture Design", Aug. 2002. (Consumer Electronics, 2002. ICCE.2002 Digest of Techical Papers. International conference on, p. 236-237.Print ISBN 0-7803-7300-6).*
A Navarro, Victor Silvia, "Fast Conversion Between DCT and Wavelet Transform Coefficients", 2006 (3rd Intl. Workshop on Mathematical Techniques).*
Po-Chin Hu, Mostafa Kavesh and Zhi-Li Zhang,"A Wavelet to DCT Progressive Image Transcoder",Sep. 2000.*
K. Viswanath, Jayanta Mukhopadhyay, P. K. Biswas, "Transcoding in the block DCT Space", 2009.*
Viswanath Kapinaiah, Jayanta Mukherjee, Prabir Kumar Biswas,"Block DCT to wavelet transcoding in transform domain", Aug. 2011. (Springer-Verlag London Limited).*
Ishfaq Ahmad, et al; "Video Transcoding: An Overview of Various Techniques and Research Issues", IEEE Transactions on Multimedia, vol. 7, No. 5, Oct. 2005, pp. 793-804.

* cited by examiner

*Primary Examiner* — Vu Le
*Assistant Examiner* — Ha Le
(74) *Attorney, Agent, or Firm* — Ladas & Parry LLP

(57) ABSTRACT

Provided is an apparatus and method for transforming between a DCT coefficient and a DWT coefficient. The transforming apparatus includes a first fundamental matrix calculating unit, a second fundamental matrix calculating unit, and a DWT coefficient calculating unit. The first fundamental matrix calculating unit calculates a first fundamental matrix by multiplying an N×N forward DWT transform matrix and an N×N matrix that has diagonal components corresponding to a transpose matrix of an 8×8 DCT transform matrix and the remaining components corresponding to an 8×8 matrix with all elements being zero. The second fundamental matrix calculating unit calculates a second fundamental matrix by multiplying an M×M matrix, which has diagonal components corresponding to an 8×8 DCT transform matrix and the remaining components corresponding to an 8×8 matrix with all elements being zero, and a transpose matrix of an M×M forward DWT transform matrix. The DWT coefficient calculating unit calculates a 2-dimensional 1-level DWT coefficient by multiplying the first fundamental matrix, a 2-dimensional 8×8 DCT transform coefficient, and the second fundamental matrix.

9 Claims, 2 Drawing Sheets

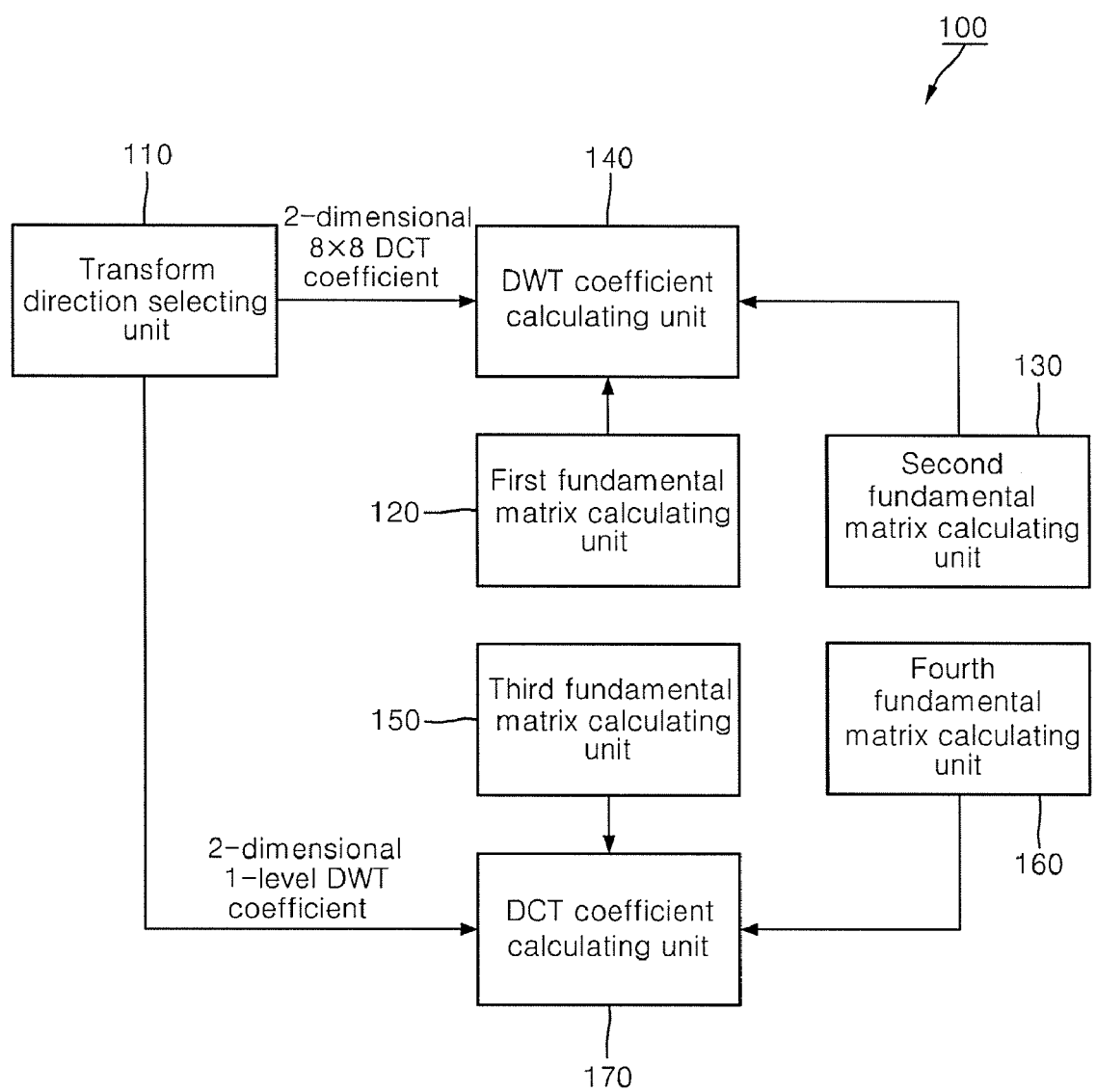

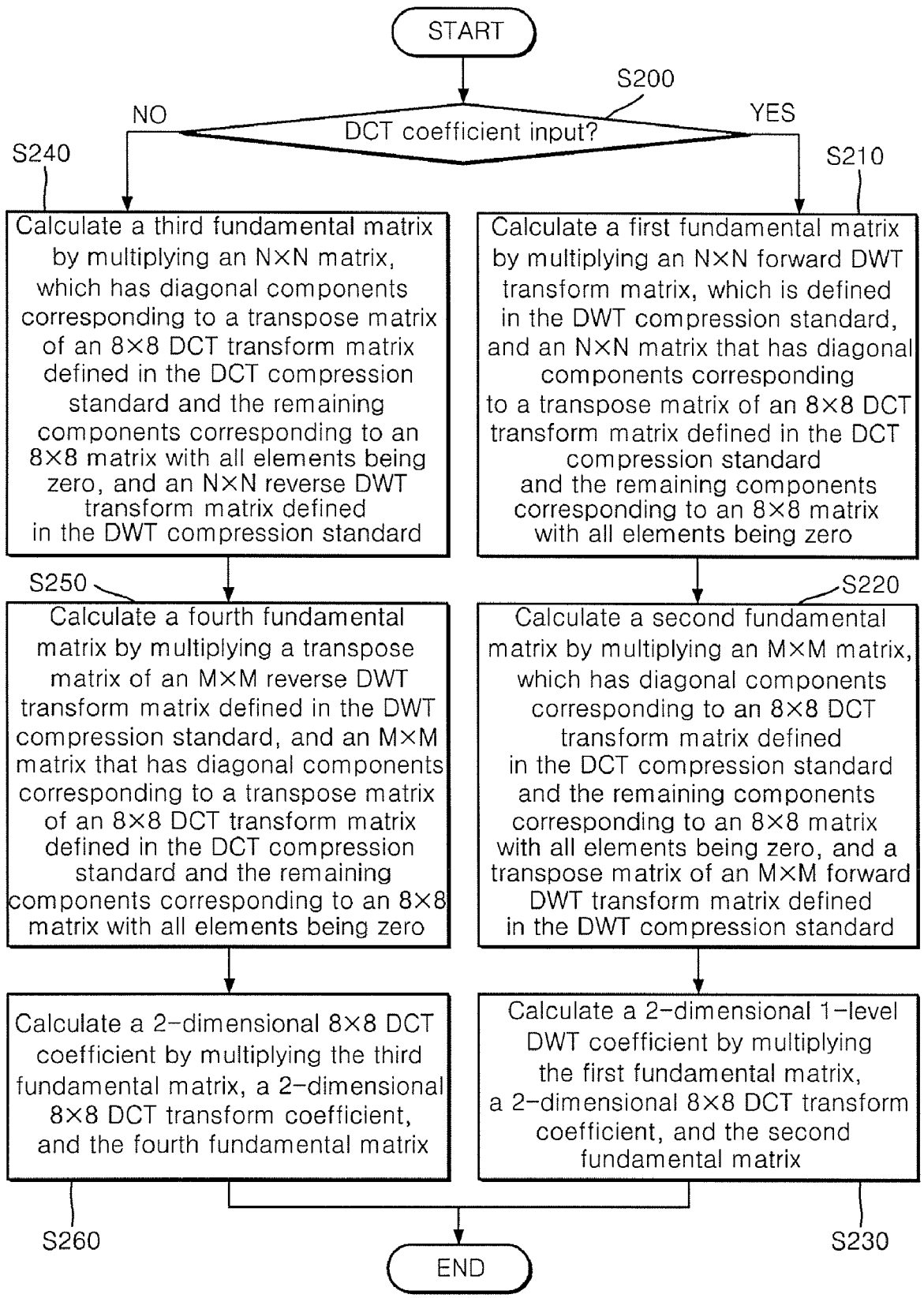

APPARATUS AND METHOD FOR TRANSFORMING BETWEEN DISCRETE COSINE TRANSFORM COEFFICIENT AND DISCRETE WAVELET TRANSFORM COEFFICIENT

CROSS-REFERENCE TO RELATED APPLICATION

This application claims priority to Korean Patent Application No. 10-2007-0068882 filed on 9 Jul. 2007 and all the benefits accruing therefrom under 35 U.S.C. §119, the contents of which are incorporated by reference in their entirety.

BACKGROUND

The present invention relates to an apparatus and method for transforming between a discrete cosine transform (DCT) coefficient and a discrete wavelet transform (DWT) coefficient, and more particularly, to an apparatus and method for transforming between a 2-dimensional 8×8 DCT coefficient, which is used in the moving picture compression standard, and a 2-dimensional 1-level DWT coefficient, which is used in JPEG2000 (Joint Photographic Experts Group 2000) that is the wavelet-based image compression standard.

With the development of communication technology and multimedia technology, multimedia data are provided through wired/wireless communication networks such as internet, mobile communication networks and so on. Multimedia data are formed in various formats depending on their type and use, and are compressed in various compression standards in consideration of the transmission efficiency on the network. For example, MPEG2 (Moving Picture Experts Group 2) and MPEG4 use 2-dimensional 8×8 DCT, while JPEG2000 uses 2-dimensional DWT.

Domain transform such as DCT is widely used in the field of signal processing. The DCT is used in JPEG image compression, and MJPEG, MPEG, and DV video compression. Herein, the 2-dimensional DCT of N×N blocks are computed and the results are quantized and entropy-coded. In this case, N is typically 8 and the DCT formula is applied to each row and column of the block. The result is an 8×8 transform coefficient matrix in which a (0,0) element is a DC component and entries with increasing vertical and horizontal index values represent higher vertical and horizontal spatial frequencies.

Meanwhile, JPEG2000 has been recently proposed as the new compression standard for still images. The JPEG 2000 uses DWT and provides a much higher compression rate than the conventional DCT-based JPEG. Also, the JPEG2000 is superior in the quality of decompressed images.

As the new still image compression standard is proposed, there is a need in the art for transforming between DCT used in the conventional image compression standard and DWT used in the new image compression standard. In particular, there is a need in the art for transforming between a DWT coefficient and a DCT coefficient in order to transcode a DWT-compressed image of the new standard JPEG 2000 into a DCT-compressed image of the conventional standard JPEG, and vise versa. However, up to now, there is no method capable of transforming between a DCT coefficient and a DWT coefficient.

SUMMARY

The present invention provides an apparatus and method for transforming between a DWT coefficient and a DCT coefficient in order to transcode a DWT-compressed image and a DCT-compressed image.

The present invention also provides a computer-readable recording medium storing a computer program that is used to execute, on a computer, a method for transforming between a DWT coefficient and a DCT coefficient in order to transcode a DWT-compressed image and a DCT-compressed image.

According to an aspect of the present invention, there is provided an apparatus for transforming between a 2-dimensional 1-level DWT coefficient and a 2-dimensional 8×8 DCT coefficient obtained from N×M image data. The apparatus includes: a first fundamental matrix calculating unit calculating a first fundamental matrix by multiplying an N×N forward DWT transform matrix and an N×N matrix that has diagonal components corresponding to a transpose matrix of an 8×8 DCT transform matrix and the remaining components corresponding to an 8×8 matrix with all elements being zero; a second fundamental matrix calculating unit calculating a second fundamental matrix by multiplying an M×M matrix, which has diagonal components corresponding to an 8×8 DCT transform matrix and the remaining components corresponding to an 8×8 matrix with all elements being zero, and a transpose matrix of an M×M forward DWT transform matrix; and a DWT coefficient calculating unit calculating a 2-dimensional 1-level DWT coefficient by multiplying the first fundamental matrix, a 2-dimensional 8×8 DCT transform coefficient, and the second fundamental matrix.

According to another aspect of the present invention, there is provided an apparatus for transforming between a 2-dimensional 1-level DWT coefficient and a 2-dimensional 8×8 DCT coefficient obtained from N×M image data. The apparatus includes: a first fundamental matrix calculating unit calculating a first fundamental matrix by multiplying an N×N matrix, which has diagonal components corresponding to a transpose matrix of an 8×8 DCT transform matrix and the remaining components corresponding to an 8×8 matrix with all elements being zero, and an N×N reverse DWT transform matrix; a second fundamental matrix calculating unit calculating a second fundamental matrix by multiplying a transpose matrix of an M×M reverse DWT transform matrix, and an M×M matrix that has diagonal components corresponding to a transpose matrix of an 8×8 DCT transform matrix and the remaining components corresponding to an 8×8 matrix with all elements being zero; and a DCT coefficient calculator configured to calculate a 2-dimensional 8×8 DCT coefficient by multiplying the first fundamental matrix, a 2-dimensional 8×8 DCT transform coefficient, and the second fundamental matrix.

According to still another an aspect of the present invention, there is provided a method for transforming between a 2-dimensional 1-level DWT coefficient and a 2-dimensional 8×8 DCT coefficient obtained from N×M image data. The method includes: calculating a first fundamental matrix by multiplying an N×N forward DWT transform matrix and an N×N matrix that has diagonal components corresponding to a transpose matrix of an 8×8 DCT transform matrix and the remaining components corresponding to an 8×8 matrix with all elements being zero; calculating a second fundamental matrix by multiplying an M×M matrix, which has diagonal components corresponding to an 8×8 DCT transform matrix and the remaining components corresponding to an 8×8 matrix with all elements being zero, and a transpose matrix of an M×M forward DWT transform matrix; and calculating a 2-dimensional 1-level DWT coefficient by multiplying the first fundamental matrix, a 2-dimensional 8×8 DCT transform coefficient, and the second fundamental matrix.

According to still another aspect of the present invention, there is provided a method for transforming between a 2-dimensional 1-level DWT coefficient and a 2-dimensional 8×8 DCT coefficient obtained from N×M image data. The method includes: calculating a first fundamental matrix by multiplying an N×N matrix, which has diagonal components corresponding to a transpose matrix of an 8×8 DCT transform matrix and the remaining components corresponding to an 8×8 matrix with all elements being zero, and an N×N reverse DWT transform matrix; calculating a second fundamental matrix by multiplying a transpose matrix of an M×M reverse DWT transform matrix, and an M×M matrix that has diagonal components corresponding to a transpose matrix of an 8×8 DCT transform matrix and the remaining components corresponding to an 8×8 matrix with all elements being zero; and calculating a 2-dimensional 8×8 DCT coefficient by multiplying the first fundamental matrix, a 2-dimensional 8×8 DCT transform coefficient, and the second fundamental matrix.

BRIEF DESCRIPTION OF THE DRAWINGS

Exemplary embodiments can be understood in more detail from the following description taken in conjunction with the accompanying drawings, in which:

FIG. 1 is a block diagram of an apparatus for transforming between a DCT coefficient and a DWT coefficient according to an exemplary embodiment of the present invention; and FIG. 2 is a flowchart showing a method for transforming between a DCT coefficient and a DWT coefficient according to an exemplary embodiment of the present invention.

DETAILED DESCRIPTION OF EMBODIMENTS

Hereinafter, specific embodiments of an apparatus and method for transforming between a DCT coefficient and a DWT coefficient will be described in detail with reference to the accompanying drawings.

First, a description will be given of 2-dimensional DCT and 2-dimensional 1-level DWT.

A formula for typical 2-dimensional DCT is expressed as Equation (1).

Forward direction:

$$F(i, j) = c(i, j) \sum_{n=0}^{N-1} \sum_{m=0}^{N-1} f(n, m) \cos \frac{\pi(2n+1)j}{2N} \cos \frac{\pi(2m+1)i}{2N}$$

Reverse direction:

$$f(n, m) = \sum_{i=0}^{N-1} \sum_{j=0}^{N-1} c(i, j) F(i, j) \cos \frac{\pi(2m+1)i}{2N} \cos \frac{\pi(2n+1)j}{2N} \quad (1)$$

where $$c(i, j) = \frac{1}{N}, c(o, j) = \frac{\sqrt{2}}{N}(j \neq 0), c(i, o) = \frac{\sqrt{2}}{N}(i \neq 0),$$

and $$c(i, j) = \frac{2}{N}(i \neq 0, j \neq 0).$$

Equation (1) can be expressed in matrix. In particular, a matrix for transforming 8×8 data is expressed as Equation (2).

$$F_{8\times 8} = C_{8\times 8} f_{8\times 8} C_{8\times 8}^T$$

$$f_{8\times 8} = C_{8\times 8}^T F_{8\times 8} C_{8\times 8} \quad (2)$$

where $F_{8\times 8}$, $C_{8\times 8}$, $f_{8\times 8}$ are all 8×8 matrixes, $C_{8\times 8}^T$ is a transpose matrix of $C_{8\times 8}$, $f_{8\times 8}$ represents image data the size of 8×8 pixels, $F_{8\times 8}$ represents an 8×8 DCT coefficient, and $C_{8\times 8}$ represents a 8×8 DCT transform matrix defined in the DCT compression standard.

If an image data the size of 16×24 pixels (16×24 image data) is to be transformed using 8×8 DCT, 8×8 DCT must be performed six times. This can be expressed as Equation (3).

$$f_{16\times 24} = \begin{bmatrix} f_{8\times 8}(1) & f_{8\times 8}(2) & f_{8\times 8}(3) \\ f_{8\times 8}(4) & f_{8\times 8}(5) & f_{8\times 8}(6) \end{bmatrix} \quad (3)$$

where $f_{16\times 24}$ is 16×24 image data, and $f_{8\times 8}(i)$ ($1 \leq i \leq 16$) are all 8×8 blocks.

Equation (3) expresses a 16×24 matrix as six 8×8 block matrixes. Thus, obtainment of an 8×8 transform coefficient for 16×24 image data is equivalent to obtainment of a matrix expressed as Equation (4). This means that 8×8 DCT is performed on each 8×8 block matrix.

$$F_{16\times 24} = \begin{bmatrix} C_{8\times 8} f_{8\times 8}(1) C_{8\times 8}^T & C_{8\times 8} f_{8\times 8}(2) C_{8\times 8}^T & C_{8\times 8} f_{8\times 8}(3) C_{8\times 8}^T \\ C_{8\times 8} f_{8\times 8}(4) C_{8\times 8}^T & C_{8\times 8} f_{8\times 8}(5) C_{8\times 8}^T & C_{8\times 8} f_{8\times 8}(6) C_{8\times 8}^T \end{bmatrix} \quad (4)$$

$$= \begin{bmatrix} F_{8\times 8}(1) & F_{8\times 8}(2) & F_{8\times 8}(3) \\ F_{8\times 8}(4) & F_{8\times 8}(5) & F_{8\times 8}(6) \end{bmatrix}$$

Equation (4) can be developed into Equation (5).

$$F_{16\times 24} = \begin{bmatrix} F_{8\times 8}(1) & F_{8\times 8}(2) & F_{8\times 8}(3) \\ F_{8\times 8}(4) & F_{8\times 8}(5) & F_{8\times 8}(6) \end{bmatrix} \quad (5)$$

$$= \begin{bmatrix} C_{8\times 8} & O_{8\times 8} \\ O_{8\times 8} & C_{8\times 8} \end{bmatrix} \begin{bmatrix} f_{8\times 8}(1) & f_{8\times 8}(2) & f_{8\times 8}(3) \\ f_{8\times 8}(4) & f_{8\times 8}(5) & f_{8\times 8}(6) \end{bmatrix}$$

$$\begin{bmatrix} C_{8\times 8}^T & O_{8\times 8} & O_{8\times 8} \\ O_{8\times 8} & C_{8\times 8}^T & O_{8\times 8} \\ O_{8\times 8} & O_{8\times 8} & C_{8\times 8}^T \end{bmatrix}$$

$$= D_{16\times 16} f_{16\times 24} D_{24\times 24}^T$$

Like the above forward matrix for 16×24 image data, a reverse matrix can be expressed as Equation (6).

$$f_{16\times 24} = \begin{bmatrix} C_{8\times 8}^T & O_{8\times 8} \\ O_{8\times 8} & C_{8\times 8}^T \end{bmatrix} \begin{bmatrix} F_{8\times 8}(1) & F_{8\times 8}(2) & F_{8\times 8}(3) \\ F_{8\times 8}(4) & F_{8\times 8}(5) & F_{8\times 8}(6) \end{bmatrix} \quad (6)$$

$$\begin{bmatrix} C_{8\times 8} & O_{8\times 8} & O_{8\times 8} \\ O_{8\times 8} & C_{8\times 8} & O_{8\times 8} \\ O_{8\times 8} & O_{8\times 8} & C_{8\times 8} \end{bmatrix}$$

$$= D^T_{16\times 16} F_{16\times 24} D_{24\times 24}$$

In Equations (5) and (6), $O_{8\times 8}$ denotes a zero matrix with all its elements being zero. Also, $$D_{16\times 16} \text{ is } \begin{bmatrix} C_{8\times 8} & O_{8\times 8} \\ O_{8\times 8} & C_{8\times 8} \end{bmatrix}, \text{ and } D_{24\times 24}^T \text{ is } \begin{bmatrix} C_{8\times 8}^T & O_{8\times 8} & O_{8\times 8} \\ O_{8\times 8} & C_{8\times 8}^T & O_{8\times 8} \\ O_{8\times 8} & O_{8\times 8} & C_{8\times 8}^T \end{bmatrix}.$$

In general, an 8×8 DCT matrix of N×M image data is expressed as Equation (7) (N and M are multiple of 8).

Forward direction: $F_{N \times M} = D_{N \times N} f_{N \times M} D_{M \times M}^T$ Reverse direction: $f_{N \times M} = D_{N \times N}^T F_{N \times M} D_{M \times M}$ (7)

The typical DWT differs depending on the boundary processing schemes and the filters used in DWT. The following description is given assuming that Daubchies D4 filter coefficients are used as an example of DWT and the boundary is processed periodically. The Daubchies D4 filter coefficients are expressed as Table 1.

TABLE 1

| Low filter coefficient | High filter coefficient |
|---|---|
| $h[0] = \dfrac{1 + \sqrt{3}}{4\sqrt{2}}$ | $g[0] = h[3]$ |
| $h[1] = \dfrac{3 + \sqrt{3}}{4\sqrt{2}}$ | $g[1] = -h[2]$ |
| $h[2] = \dfrac{3 - \sqrt{3}}{4\sqrt{2}}$ | $g[2] = h[1]$ |
| $h[3] = \dfrac{1 - \sqrt{3}}{4\sqrt{2}}$ | $g[3] = -h[0]$ |

1-dimensional 1-level DWT is performed by convolution of filter coefficients and 1-dimensional data, and 1-dimensional 1-level DWT of N=6 1-dimensional data is expressed in matrix as follows.

*Forward Direction $F_6 = U_{6 \times 6} f_6$ $$\begin{bmatrix} a[0] \\ a[1] \\ a[2] \\ c[0] \\ c[1] \\ c[2] \end{bmatrix} = \begin{bmatrix} h[0] & h[1] & h[2] & h[3] & 0 & 0 \\ 0 & 0 & h[0] & h[1] & h[2] & h[3] \\ \underline{h[2]} & \underline{h[3]} & 0 & 0 & h[0] & h[1] \\ g[0] & g[1] & g[2] & g[3] & 0 & 0 \\ 0 & 0 & g[0] & g[1] & g[2] & g[3] \\ \underline{g[2]} & \underline{g[3]} & 0 & 0 & g[0] & g[1] \end{bmatrix} \begin{bmatrix} f[0] \\ f[1] \\ f[2] \\ f[3] \\ f[4] \\ f[5] \end{bmatrix}$$

*Reverse Direction $f_6 = V_{6 \times 6} F_6$ $$\begin{bmatrix} f[0] \\ f[1] \\ f[2] \\ f[3] \\ f[4] \\ f[5] \end{bmatrix} = \begin{bmatrix} h[0] & 0 & \underline{h[2]} & g[0] & 0 & \underline{g[2]} \\ h[1] & 0 & \underline{h[3]} & g[1] & 0 & \underline{g[3]} \\ h[2] & h[0] & 0 & g[2] & g[0] & 0 \\ h[3] & h[1] & 0 & g[3] & g[1] & 0 \\ 0 & h[2] & h[0] & 0 & g[2] & g[0] \\ 0 & h[3] & h[1] & 0 & g[3] & g[1] \end{bmatrix} \begin{bmatrix} a[0] \\ a[1] \\ a[2] \\ c[0] \\ c[1] \\ c[2] \end{bmatrix}$$

Also, 1-dimensional 1-level DWT of N=8 1-dimensional data is expressed in matrix as follows.

*Forward Direction $F_8 = U_{8 \times 8} f_8$ $$\begin{bmatrix} a[0] \\ a[1] \\ a[2] \\ a[3] \\ c[0] \\ c[1] \\ c[2] \\ c[3] \end{bmatrix} = \begin{bmatrix} h[0] & h[1] & h[2] & h[3] & 0 & 0 & 0 & 0 \\ 0 & 0 & h[0] & h[1] & h[2] & h[3] & 0 & 0 \\ 0 & 0 & 0 & 0 & h[0] & h[1] & h[2] & h[3] \\ \underline{h[2]} & \underline{h[3]} & 0 & 0 & 0 & 0 & h[0] & h[1] \\ g[0] & g[1] & g[2] & g[3] & 0 & 0 & 0 & 0 \\ 0 & 0 & g[0] & g[1] & g[2] & g[3] & 0 & 0 \\ 0 & 0 & 0 & 0 & g[0] & g[1] & g[2] & g[3] \\ \underline{g[2]} & \underline{g[3]} & 0 & 0 & 0 & 0 & g[0] & g[1] \end{bmatrix} \begin{bmatrix} f[0] \\ f[1] \\ f[2] \\ f[3] \\ f[4] \\ f[5] \\ f[6] \\ f[7] \end{bmatrix}$$

*Reverse Direction $f_8 = V_{8 \times 8} F_8$ $$\begin{bmatrix} f[0] \\ f[1] \\ f[2] \\ f[3] \\ f[4] \\ f[5] \\ f[6] \\ f[7] \end{bmatrix} = \begin{bmatrix} h[0] & 0 & 0 & \underline{h[2]} & g[0] & 0 & 0 & \underline{g[2]} \\ h[1] & 0 & 0 & \underline{h[3]} & g[1] & 0 & 0 & \underline{g[3]} \\ h[2] & h[0] & 0 & 0 & g[2] & g[0] & 0 & 0 \\ h[3] & h[1] & 0 & 0 & g[3] & g[1] & 0 & 0 \\ 0 & h[2] & h[0] & 0 & 0 & g[2] & g[0] & 0 \\ 0 & h[3] & h[1] & 0 & 0 & g[3] & g[1] & 0 \\ 0 & 0 & h[2] & h[0] & 0 & 0 & g[2] & g[0] \\ 0 & 0 & h[3] & h[1] & 0 & 0 & g[3] & g[1] \end{bmatrix} \begin{bmatrix} a[0] \\ a[1] \\ a[2] \\ a[3] \\ c[0] \\ c[1] \\ c[2] \\ c[3] \end{bmatrix}$$

The underlined elements in the forward/reverse matrix expressions of the 1-dimensional 1-level DWT are to reflect the periodic processing of the boundaries in the DWT process on a transform matrix. It can be inferred from the above example of the 1-dimensional 1-level DWT that by which equation a 1-dimensional 1-level DWT matrix for N (N: an even number) is configured. The 1-dimensional 1-level DWT for N data can be expressed as Equation (8).

Forward direction: $F_N = U_{N \times N} f_N$

Reverse direction: $f_N V_{N \times N} F_N$ (8)

Herein, if N is an even number, the relationship of $V_{N \times N} = U_{N \times N}^T$ is satisfied. However, in the typical DWT, the relationship of $V_{N \times N} = U_{N \times N}^T$ is not satisfied because an analytic filter coefficient is not equal to a synthetic filter coefficient. Also, $U_{N \times N}$ and $V_{N \times N}$ are defined in the DWT compression standard.

Forward 2-dimensional 1-level DWT may be performed by performing column-direction 1-dimensional 1-level DWT on 2-dimensional data to be transformed and then performing row-direction 1-dimensional 1-level DWT on the result. Likewise, reverse 2-dimensional 1-level DWT may be performed by reverse 1-dimensional 1-level DWT.

The matrix expression of 2-dimensional 1-level DWT for N×N (N: an even number) is expressed as Equation (9).

Forward direction: $F_{N \times M} = U_{N \times M} f_{N \times M} U_{N \times M}^T$ Reverse direction: $f_{N \times M} = V_{N \times M} F_{N \times M} V_{N \times M}^T$ (9)

Also, the matrix expression of 2-dimensional 1-level DWT for N×M (N and M are even numbers) is expressed as Equation (10).

Forward direction: $F_{N \times M} U_{N \times N} f_{N \times M} U_{M \times M}^T$ Reverse direction: $f_{N \times M} = V_{N \times N} F_{N \times M} V_{M \times M}^T$ (10)

A transform matrix between a coefficient matrix of 2-dimensional 8×8 DCT and a coefficient matrix of 2-dimensional 1-level DWT can be obtained on the basis of the coefficient matrix of 2-dimensional 8×8 DCT and the coefficient matrix of 2-dimensional 1-level DWT as described above.

The transform matrix for obtaining the coefficient matrix of 2-dimensional 1-level DWT from the coefficient matrix of 2-dimensional 8×8 DCT is obtained by performing reverse DCT on the coefficient of 2-dimensional 8×8 DCT to obtain the original data and then performing 2-dimensional 1-level DWT on the obtained original data. This can be expressed as Equation (11).

$$F'_{N \times M} U_{N \times N} D_{N \times N}{}^T F_{N \times M} D_{M \times M} U_{M \times M}{}^T \quad (11)$$

where $F'_{N \times M}$ is a 2-dimensional 1-level DWT coefficient, $F_{N \times M}$ is a 2-dimensional 8×8 DCT coefficient, and $D_{N \times N}{}^T F_{N \times M} D_{M \times M}$ is a result obtained by performing 2-dimensional 8×8 reverse DCT, that is, the original data.

Assuming that $A_{N \times N} = U_{N \times N} D_{N \times N}{}^T$ and $A_{M \times M}{}^T = D_{M \times M} U_{M \times M}{}^T$ in Equation (11), the transform matrix for obtaining the coefficient matrix of 2-dimensional 1-level DWT from the coefficient matrix of 2-dimensional 8×8 DCT is expressed as Equation (12).

$$F'_{N \times M} = A_{N \times N} F_{N \times M} A_{M \times M}{}^T \quad (12)$$

In Equation (12), $A_{N \times N}$ can be calculated in advance because $U_{N \times N}$ is a forward DWT transform matrix defined in the DWT compression standard and $D_{N \times N}{}^T$ can be obtained from a DCT transform matrix (i.e., $C_{N \times N}$) defined in the DCT compression standard. Likewise, $A_{M \times M}{}^T$ can be calculated in advance.

Also, the transform matrix for obtaining the coefficient matrix of 2-dimensional 8×8 DCT from the coefficient matrix of 2-dimensional 1-level DWT is obtained by performing 2-dimensional 1-level reverse DWT on a 2-dimensional 1-level DWT coefficient to obtain the original data and then performing 2-dimensional 8×8 DCT on the obtained original data. This can be expressed as Equation (13).

$$F_{N \times M} D_{N \times N} V_{N \times N} F'_{N \times M} V_{M \times M}{}^T D_{M \times M}{}^T \quad (13)$$

where $F_{N \times M}$ is a 2-dimensional 8×8 DCT coefficient, $F'_{N \times M}$ is a 2-dimensional 1-level DWT coefficient, and $V_{N \times N} F'_{N \times M} V_{M \times M}{}^T$ is a result obtained by performing 1-dimensional 1-level reverse DWT, that is, the original data.

Assuming that $B_{N \times N} = D_{N \times N} V_{N \times N}$ and $B_{M \times M}{}^T = V_{M \times M}{}^T D_{M \times M}{}^T$ in Equation (13), the transform matrix for obtaining a 2-dimensional 8×8 DCT coefficient matrix from a 2-dimensional 1-level DWT coefficient matrix from is expressed as Equation (14).

$$F_{N \times M} = B_{N \times N} F'_{N \times M} B_{M \times M}{}^T \quad (14)$$

In Equation (14), $B_{N \times N}$ can be calculated in advance because $V_{N \times N}$ is a reverse DWT transform matrix defined in the DWT compression standard and $D_{N \times N}$ can be obtained from a DCT transform matrix (i.e., $C_{N \times N}$) defined in the DCT compression standard. Likewise, $B_{M \times M}{}^T$ can be calculated in advance.

The method of transforming the 2-dimensional 1-level DWT coefficient into the DCT coefficient has been described above. This method can be applied to the two-level or more DWT transform by transforming the two-level or more DWT into the 1-level DWT in a sequential manner.

FIG. 1 is a block diagram of an apparatus for transforming between a DCT coefficient and a DWT coefficient according to an exemplary embodiment of the present invention. FIG. 2 is a flowchart showing a method for transforming between a DCT coefficient and a DWT coefficient according to an exemplary embodiment of the present invention.

Referring to FIGS. 1 and 2, an apparatus 100 for transforming between a DCT coefficient and a DWT coefficient includes a transform direction selecting unit 110, a first fundamental matrix calculating unit 120, a second fundamental matrix calculating unit 130, a DWT coefficient calculating unit 140, a third fundamental matrix calculating unit 150, a fourth fundamental matrix calculating unit 160, and a DCT coefficient calculating unit 170.

The transform direction selecting unit 110 selectively provides an input N×M (e.g., 16×24) matrix coefficient to the DWT coefficient calculating unit 140 or the DCT coefficient calculating unit 170 depending on the coefficient type. Herein, the determination of the coefficient type may be made on the basis of the coefficient characteristics, or may be made on the basis of the coefficient type information input by a user.

The first fundamental matrix calculating unit 120 calculates a first fundamental matrix by multiplying an N×N forward DWT transform matrix, which is defined in the DWT compression standard, and an N×N matrix that has diagonal components corresponding to a transpose matrix of an 8×8 DCT transform matrix defined in the DCT compression standard and the remaining components corresponding to an 8×8 matrix with all elements being zero (S210). The second fundamental matrix calculating unit 130 calculates a second fundamental matrix by multiplying an M×M matrix, which has diagonal components corresponding to an 8×8 DCT transform matrix defined in the DCT compression standard and the remaining components corresponding to an 8×8 matrix with all elements being zero, and a transpose matrix of an M×M forward DWT transform matrix defined in the DWT compression standard (S220). The DWT coefficient calculating unit 140 calculates a 2-dimensional 1-level DWT coefficient by multiplying the first fundamental matrix, a 2-dimensional 8×8 DCT transform coefficient, and the second fundamental matrix (S230).

The third fundamental matrix calculating unit 150 calculates a third fundamental matrix by multiplying an N×N matrix, which has diagonal components corresponding to a transpose matrix of an 8×8 DCT transform matrix defined in the DCT compression standard and the remaining components corresponding to an 8×8 matrix with all elements being zero, and an N×N reverse DWT transform matrix defined in the DWT compression standard (S240). The fourth fundamental matrix calculating unit 160 calculates a fourth fundamental matrix by multiplying a transpose matrix of an M×M reverse DWT transform matrix defined in the DWT compression standard, and an M×M matrix that has diagonal components corresponding to a transpose matrix of an 8×8 DCT transform matrix defined in the DCT compression standard and the remaining components corresponding to an 8×8 matrix with all elements being zero (S250). The DCT coefficient calculating unit 170 calculates a 2-dimensional 8×8 DCT coefficient by multiplying the third fundamental matrix, a 2-dimensional 8×8 DCT transform coefficient, and the fourth fundamental matrix (S260).

The above embodiment relates to the apparatus for transforming between a DCT coefficient and a DWT coefficient. However, it is also possible to configure an apparatus for transforming a DCT coefficient into a DWT coefficient or an apparatus for transforming a DWT coefficient into a DCT coefficient. In this case, the transform direction selecting unit 110 is excluded from the configuration of the above embodiment, and the input N×M (e.g., 16×24) matrix coefficient is directly provided to the DWT coefficient calculating unit 140 or the DCT coefficient calculating unit 170.

As described above, the use of the apparatus and method for transforming between a DCT coefficient and a DWT coefficient makes it possible to transform between a DCT coefficient and a DWT coefficient in a simple fashion, without performing a process of obtaining an original image, by performing IDCT or IDWT on a compressed image.

The invention can also be embodied as computer-readable codes on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion.

Although the apparatus and method for transforming between a DCT coefficient and a DWT coefficient have been described with reference to the specific embodiments, they are not limited thereto. Therefore, it will be readily understood by those skilled in the art that various modifications and changes can be made thereto without departing from the spirit and scope of the present invention defined by the appended claims.

What is claimed is:

1. An apparatus for transforming between a 2-dimensional 1-level DWT coefficient and a 2-dimensional 8×8 DCT coefficient obtained from N×M image data, the apparatus comprising:
   a first fundamental matrix calculating unit calculating a first fundamental matrix by multiplying an N×N forward DWT transform matrix and an N×N matrix that has diagonal components corresponding to a transpose matrix of an 8×8 DCT transform matrix and the remaining components corresponding to an 8×8 matrix with all elements being zero;
   a second fundamental matrix calculating unit calculating a second fundamental matrix by multiplying an M×M matrix, which has diagonal components corresponding to an 8×8 DCT transform matrix and the remaining components corresponding to an 8×8 matrix with all elements being zero, and a transpose matrix of an M×M forward DWT transform matrix; and
   a DWT coefficient calculating unit calculating a 2-dimensional 1-level DWT coefficient by multiplying the first fundamental matrix, a 2-dimensional 8×8 DCT transform coefficient, and the second fundamental matrix.

2. The apparatus of claim 1, further comprising:
   a third fundamental matrix calculating unit calculating a third fundamental matrix by multiplying an N×N matrix, which has diagonal components corresponding to a transpose matrix of an 8×8 DCT transform matrix and the remaining components corresponding to an 8×8 matrix with all elements being zero, and an N×N reverse DWT transform matrix;
   a fourth fundamental matrix calculating unit calculating a fourth fundamental matrix by multiplying a transpose matrix of an M×M reverse DWT transform matrix, and an M×M matrix that has diagonal components corresponding to a transpose matrix of an 8×8 DCT transform matrix and the remaining components corresponding to an 8×8 matrix with all elements being zero; and
   a DCT coefficient calculating unit calculating a 2-dimensional 8×8 DCT coefficient by multiplying the third fundamental matrix, a 2-dimensional 8×8 DCT transform coefficient, and the fourth fundamental matrix.

3. The apparatus of claim 2, further comprising a transform direction selecting unit selectively providing an input coefficient to the DWT coefficient calculating unit or the DCT coefficient calculating unit depending on the type of the input coefficient.

4. A method for transforming between a 2-dimensional 1-level DWT coefficient and a 2-dimensional 8×8 DCT coefficient obtained from N×M image data, the method comprising:
   calculating a first fundamental matrix by multiplying an N×N forward DWT transform matrix and an N×N matrix that has diagonal components corresponding to a transpose matrix of an 8×8 DCT transform matrix and the remaining components corresponding to an 8×8 matrix with all elements being zero;
   calculating a second fundamental matrix by multiplying an M×M matrix, which has diagonal components corresponding to an 8×8 DCT transform matrix and the remaining components corresponding to an 8×8 matrix with all elements being zero, and a transpose matrix of an M×M forward DWT transform matrix; and
   calculating a 2-dimensional 1-level DWT coefficient by multiplying the first fundamental matrix, a 2-dimensional 8×8 DCT transform coefficient, and the second fundamental matrix.

5. The method of claim 4, further comprising:
   calculating a third fundamental matrix by multiplying an N×N matrix, which has diagonal components corresponding to a transpose matrix of an 8×8 DCT transform matrix and the remaining components corresponding to an 8×8 matrix with all elements being zero, and an N×N reverse DWT transform matrix;
   calculating a fourth fundamental matrix by multiplying a transpose matrix of an M×M reverse DWT transform matrix, and an M×M matrix that has diagonal components corresponding to a transpose matrix of an 8×8 DCT transform matrix and the remaining components corresponding to an 8×8 matrix with all elements being zero; and
   calculating a 2-dimensional 8×8 DCT coefficient by multiplying the third fundamental matrix, a 2-dimensional 8×8 DCT transform coefficient, and the fourth fundamental matrix.

6. An apparatus for transforming between a 2-dimensional 1-level DWT coefficient and a 2-dimensional 8×8 DCT coefficient obtained from N×M image data, the apparatus comprising:
   a first fundamental matrix calculating unit calculating a first fundamental matrix by multiplying an N×N matrix, which has diagonal components corresponding to a transpose matrix of an 8×8 DCT transform matrix and the remaining components corresponding to an 8×8 matrix with all elements being zero, and an N×N reverse DWT transform matrix;
   a second fundamental matrix calculating unit calculating a second fundamental matrix by multiplying a transpose matrix of an M×M reverse DWT transform matrix, and an M×M matrix that has diagonal components corresponding to a transpose matrix of an 8×8 DCT transform matrix and the remaining components corresponding to an 8×8 matrix with all elements being zero; and
   a DCT coefficient calculating unit calculating a 2-dimensional 8×8 DCT coefficient by multiplying the first fundamental matrix, a 2-dimensional 8×8 DCT transform coefficient, and the second fundamental matrix.

7. A method for transforming between a 2-dimensional 1-level DWT coefficient and a 2-dimensional 8×8 DCT coefficient obtained from N×M image data, the method comprising:
- calculating a first fundamental matrix by multiplying an N×N matrix, which has diagonal components corresponding to a transpose matrix of an 8×8 DCT transform matrix and the remaining components corresponding to an 8×8 matrix with all elements being zero, and an N×N reverse DWT transform matrix;
- calculating a second fundamental matrix by multiplying a transpose matrix of an M×M reverse DWT transform matrix, and an M×M matrix that has diagonal components corresponding to a transpose matrix of an 8×8 DCT transform matrix and the remaining components corresponding to an 8×8 matrix with all elements being zero; and
- calculating a 2-dimensional 8×8 DCT coefficient by multiplying the first fundamental matrix, a 2-dimensional 8×8 DCT transform coefficient, and the second fundamental matrix.

8. A non-transitory computer-readable recording medium storing a computer program that is used to execute, on a computer, a method for transforming between a DWT coefficient and a DCT coefficient, the method comprising:
- calculating a first fundamental matrix by multiplying an N×N forward DWT transform matrix and an N×N matrix that has diagonal components corresponding to a transpose matrix of an 8×8 DCT transform matrix and the remaining components corresponding to an 8×8 matrix with all elements being zero;
- calculating a second fundamental matrix by multiplying an M×M matrix, which has diagonal components corresponding to an 8×8 DCT transform matrix and the remaining components corresponding to an 8×8 matrix with all elements being zero, and a transpose matrix of an M×M forward DWT transform matrix; and
- calculating a 2-dimensional 1-level DWT coefficient by multiplying the first fundamental matrix, a 2-dimensional 8×8 DCT transform coefficient, and the second fundamental matrix.

9. A non-transitory computer-readable recording medium storing a computer program that is used to execute, on a computer, a method for transforming between a DWT coefficient and a DCT coefficient, the method comprising:
- calculating a first fundamental matrix by multiplying an N×N matrix, which has diagonal components corresponding to a transpose matrix of an 8×8 DCT transform matrix and the remaining components corresponding to an 8×8 matrix with all elements being zero, and an N×N reverse DWT transform matrix;
- calculating a second fundamental matrix by multiplying a transpose matrix of an M×M reverse DWT transform matrix, and an M×M matrix that has diagonal components corresponding to a transpose matrix of an 8×8 DCT transform matrix and the remaining components corresponding to an 8×8 matrix with all elements being zero; and
- calculating a 2-dimensional 8×8 DCT coefficient by multiplying the first fundamental matrix, a 2-dimensional 8×8 DCT transform coefficient, and the second fundamental matrix.

* * * * *